US011101470B2

(12) United States Patent
Ishida et al.

(10) Patent No.: US 11,101,470 B2
(45) Date of Patent: Aug. 24, 2021

(54) FUEL CELL AND FUEL CELL STACK

(71) Applicant: HONDA MOTOR CO., LTD., Tokyo (JP)

(72) Inventors: Kentaro Ishida, Wako (JP); Yu Tomana, Wako (JP); Hiroshi Morikawa, Wako (JP); Yosuke Nishida, Wako (JP); Takahiro Fukuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 16/242,054

(22) Filed: Jan. 8, 2019

(65) Prior Publication Data

US 2019/0214656 A1 Jul. 11, 2019

(30) Foreign Application Priority Data

Jan. 10, 2018 (JP) .............................. JP2018-002233

(51) Int. Cl.

| *H01M 8/026* | (2016.01) |
|---|---|
| *H01M 8/0254* | (2016.01) |
| *H01M 8/0267* | (2016.01) |
| *H01M 8/04089* | (2016.01) |
| *H01M 8/0206* | (2016.01) |
| *H01M 8/241* | (2016.01) |
| *H01M 8/0258* | (2016.01) |

(Continued)

(52) U.S. Cl.
CPC ......... *H01M 8/026* (2013.01); *H01M 8/0206* (2013.01); *H01M 8/0254* (2013.01); *H01M 8/0258* (2013.01); *H01M 8/0267* (2013.01); *H01M 8/04089* (2013.01); *H01M 8/1004* (2013.01); *H01M 8/241* (2013.01); *H01M 2008/1095* (2013.01)

(58) Field of Classification Search
CPC .. H01M 8/026; H01M 8/0254; H01M 8/0267; H01M 8/241; H01M 8/04089; H01M 8/0206
See application file for complete search history.

(56) References Cited

U.S. PATENT DOCUMENTS

2004/0229100 A1* 11/2004 Komura .............. H01M 8/0263
  429/457
2018/0166708 A1 6/2018 Yaginuma et al.

FOREIGN PATENT DOCUMENTS

JP 2001-250568 9/2001
JP 2001250568 A * 9/2001 .............. H01M 8/02

(Continued)

OTHER PUBLICATIONS

Japanese Office Action for Japanese Patent Application No. 2018-002233 dated Jul. 2, 2019.

*Primary Examiner* — Karie O'Neill Apicella
(74) *Attorney, Agent, or Firm* — Amin, Turocy & Watson LLP

(57) ABSTRACT

Oxygen-containing gas discharge passages are provided in a first metal separator of a fuel cell of a fuel cell stack. The oxygen-containing gas discharge passages include an upper oxygen-containing gas discharge passages and a lower oxygen-containing gas discharge passage. In the first metal separator, a central position at the center between the upper oxygen-containing gas discharge passage and the lower oxygen-containing gas discharge passage is positioned below the center of an oxygen-containing gas flow field in the gravity direction.

9 Claims, 10 Drawing Sheets

(51) Int. Cl.
*H01M 8/1004* (2016.01)
*H01M 8/1018* (2016.01)

(56) References Cited

FOREIGN PATENT DOCUMENTS

| | | |
|---|---|---|
| JP | 2015-060732 | 3/2015 |
| WO | 2016/181523 | 11/2016 |

* cited by examiner

FUEL CELL AND FUEL CELL STACK

CROSS-REFERENCE TO RELATED APPLICATION

This application is based upon and claims the benefit of priority from Japanese Patent Application No. 2018-002233 filed on Jan. 10, 2018, the contents of which are incorporated herein by reference.

BACKGROUND OF THE INVENTION

Field of the Invention

The present invention relates to a fuel cell and a fuel cell stack, including a membrane electrode assembly formed by providing electrodes on both sides of an electrolyte membrane and separators provided on both sides of the membrane electrode assembly.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly includes a solid polymer electrolyte membrane, an anode provided on one side of the solid polymer electrolyte membrane, and a cathode on the other side of the solid polymer electrolyte membrane.

The membrane electrode assembly is sandwiched between separators (bipolar plates) to form a fuel cell. In use, a predetermined number of fuel cells are stacked together to form, e.g., an in-vehicle fuel cell stack mounted in a vehicle.

The fuel cell stack of this type includes reactant gas supply passages (a fuel gas supply passage and an oxygen-containing gas supply passage) and reactant gas discharge passages (a fuel gas discharge passage and an oxygen-containing gas discharge passage). The reactant gas supply passages and the reactant gas discharge passages extend through the fuel cells (power generation cells) in the stacking direction. The reactant gas supply passages and the reactant gas discharge passages are connected to reactant gas flow fields (a fuel gas flow field and an oxygen-containing gas flow field) for supplying reactant gases along electrode surfaces.

As described in Japanese Laid-Open Patent Publication No. 2015-060732, during power generation of a fuel cell, water is produced at the cathode as a result of a reaction, and back diffusion of the produced water may occur at the anode. As a result, stagnation of the produce water occurs at lower positions of the reactant gas flow fields, and the oxygen-containing gas and the fuel gas do not flow smoothly. Therefore, the power generation performance may be degraded disadvantageously due to shortage in the supply of the oxygen-containing gas and the fuel gas.

SUMMARY OF THE INVENTION

The present invention has been made taking the problem into account, and an object of the present invention is to provide a fuel cell and a fuel cell stack in which, without requiring the fuel cell to have a large size, it is possible to suppress stagnation of produced water at lower positions of reactant gas flow fields, and suppress decrease in power generation performance.

In order to achieve the above object, a fuel cell according to the present invention includes a membrane electrode assembly including electrodes on both sides of an electrolyte membrane; and separators provided on both sides of the membrane electrode assembly; wherein each of the separators includes; a reactant gas flow field configured to allow a reactant gas to flow along an electrode surface in a horizontal direction; a reactant gas supply passage connected to one end of the reactant gas flow field in the horizontal direction, and configured to allow the reactant gas to flow in a stacking direction in which the membrane electrode assembly and the separators are stacked together; and a reactant gas discharge passage connected to another end of the reactant gas flow field in the horizontal direction, and configured to allow the reactant gas to flow in the stacking direction, and the reactant gas discharge passage includes: an upper reactant gas discharge passage; and a lower reactant gas discharge passage positioned below the upper reactant gas discharge passage; wherein, in the separator, a central point at a center between the upper reactant gas discharge passage and the lower reactant gas discharge passage is positioned below a center of the reactant gas flow field in a gravity direction.

In the fuel cell, preferably, the reactant gas flow field includes a plurality of reactant gas flow grooves extending in the horizontal direction and arranged in the gravity direction and at least part of a bottom surface of the lower reactant gas discharge passage is positioned below a bottom surface of the reactant gas flow groove at a lowermost position.

In the fuel cell, preferably, an entire bottom surface of the lower reactant gas discharge passage is positioned below the bottom surface of the reactant gas flow groove at the lowermost position.

In the fuel cell, preferably, an upper surface of the lower reactant gas discharge passage is positioned above the bottom surface of the reactant gas flow groove at the lowermost position.

In the fuel cell, preferably, the bottom surface of the lower reactant gas discharge passage is inclined from the horizontal direction.

In the fuel cell, preferably, in the separator, a central point at a center between a lower end of the upper reactant gas discharge passage and an upper end of the lower reactant gas discharge passage is positioned below the center of the reactant gas flow field in the gravity direction.

A fuel cell stack according to the present invention includes a stack body including a plurality of the above-mentioned fuel cells stacked in the stacking direction.

In the fuel cell stack, preferably, a connection channel is provided, and the connection channel is configured to connect an end of the upper reactant gas discharge passage opposite to the flow direction of the reactant gas and an end of the lower reactant gas discharge passage opposite to the flow direction of the reactant gas together.

In the fuel cell stack, preferably, a drain connected to the connection channel is provided, and the drain is configured to discharge water produced in the connection channel to outside.

In the fuel cell stack, preferably, the drain is positioned below the lower reactant gas discharge passage.

In the fuel cell and the fuel cell stack of the present invention, a central point at the center between the upper reactant gas discharge passage and the lower reactant gas discharge passage is positioned below the center of the reactant gas flow field in the gravity direction.

In the structure, in comparison with the case where the central point at the center between the upper reactant gas discharge passage and the lower reactant gas discharge passage is positioned at the same height as the center of the reactant gas flow field in the gravity direction, it is possible to provide the lower reactant gas discharge passage at a lower position without increasing the distance between the upper reactant gas discharge passage and the lower reactant gas discharge passage. In this manner, it is possible to smoothly discharge the water produced in the reactant gas flow field to the lower reactant gas discharge passage. Accordingly, without requiring the fuel cell to have a large size, it is possible to suppress stagnation of the produced water at the lower position of the reactant gas flow field.

Further, since it is possible to discharge the reactant gas in the reactant gas flow field from both of the lower reactant gas discharge passage and the upper reactant gas discharge passage, the reactant gas can flow the reactant gas flow field smoothly. Accordingly, it is possible to suppress decrease in the power generation performance due to shortage in the supply of the reactant gas.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a fuel cell stack according to the present invention will be described with reference to the accompanying drawings.

Figure 1:
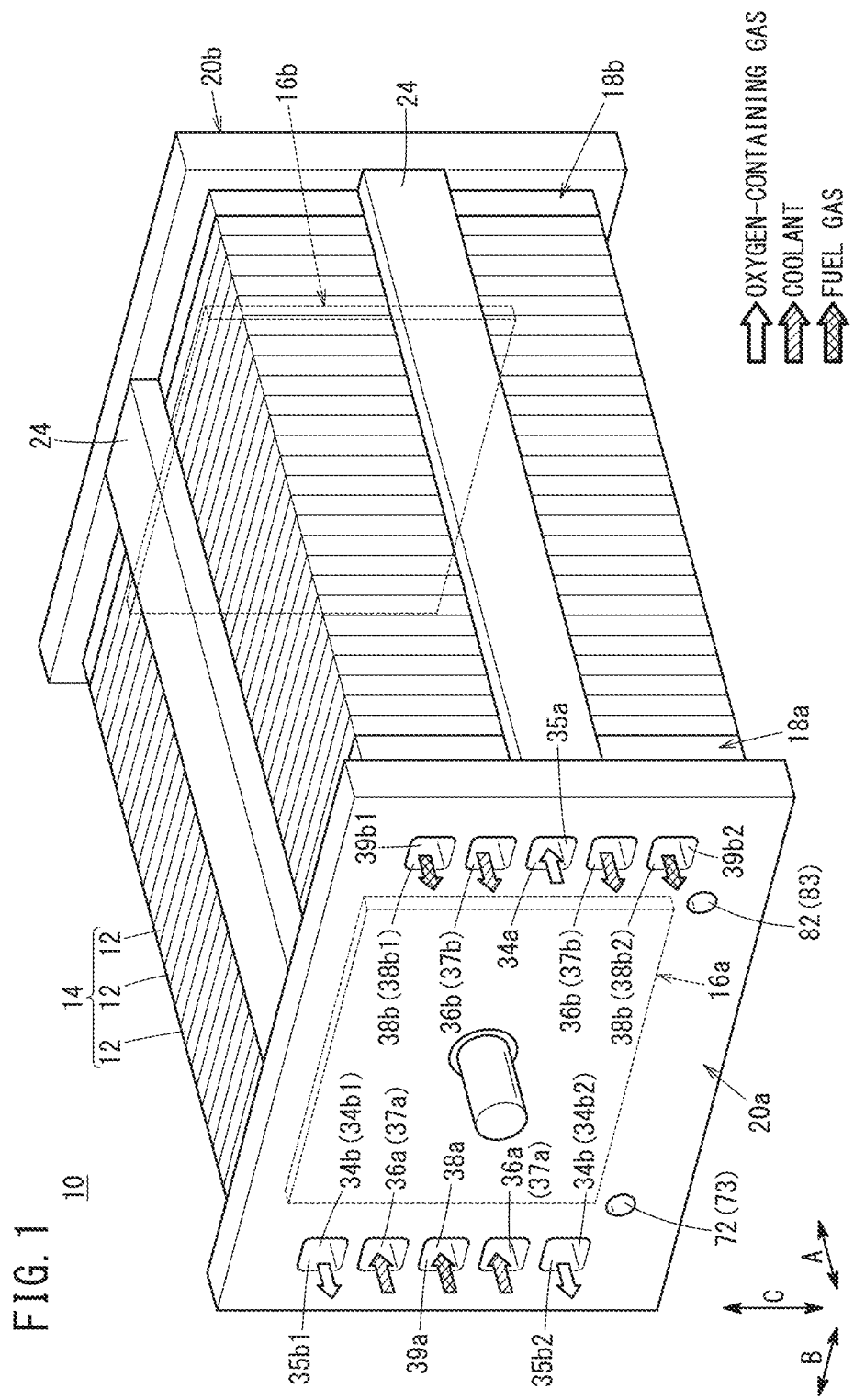
FIG. 1 is a perspective view showing a fuel cell stack according to an embodiment of the present invention.

As shown in FIG. 1, a fuel cell stack 10 includes a stack body 14 formed by stacking a plurality of power generation cells (fuel cells) 12 in a horizontal direction (indicated by an arrow A) or in a gravity direction (indicated by an arrow C). For example, the fuel cell stack 10 is mounted in a fuel cell vehicle such as a fuel cell electric automobile (not shown).

At one end of the stack body 14 in the stacking direction indicated by the arrow A, a terminal plate 16a (power collection plate) is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b. The insulator 18a (one of the insulators 18a, 18b) is provided between the stack body 14 and the end plate 20a (one of the end plates 20a, 20b). The other insulator 18b is provided between the stack body 14 and the other end plate 20b. The insulators 18a, 18b are made of insulating material, such as polycarbonate (PC) or phenol resin, etc.

Each of the end plates 20a, 20b has a laterally elongated (or longitudinally elongated) rectangular shape. Coupling bars 24 are positioned between the sides of the end plates 20a, 20b. Both ends of the coupling bars 24 are fixed to inner surfaces of the end plates 20a, 20b to apply a tightening load to a plurality of stacked fuel cells 12 in the stacking direction indicated by the arrow A. It should be noted that the fuel cell stack 10 may have a casing including the end plates 20a, 20b, and the stack body 14 may be placed in the casing.

Figure 2:
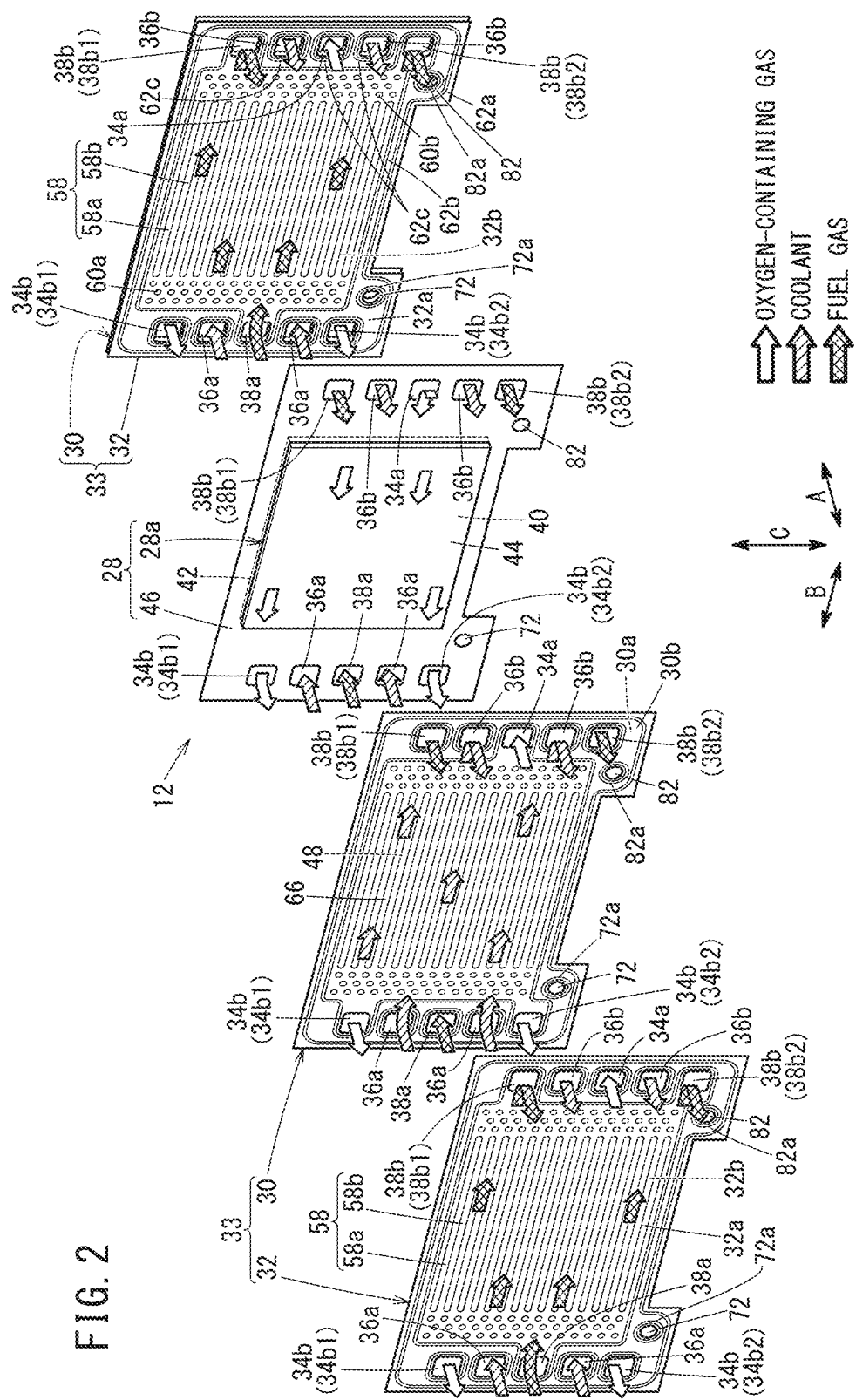
FIG. 2 is an exploded perspective view showing a fuel cell.

As shown in FIG. 2, the fuel cell 12 is formed by sandwiching a resin frame equipped MEA 28 between a first metal separator 30 and a second metal separator 32. Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Outer ends of the first metal separator 30 and the second metal separator 32 are joined together by welding, brazing, crimpling, etc. to form a joint separator 33.

The resin frame equipped MEA 28 includes a membrane electrode assembly 28a (hereinafter referred to as the "MEA 28a"), and a resin frame member 46 joined to, and around an outer peripheral portion of the MEA 28a. The MEA 28a includes an electrolyte membrane 40, and an anode 42 (first electrode) provided on one surface of the electrolyte membrane 40, and a cathode 44 (second electrode) provided on the other surface of the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

Though not shown in detail, the anode 42 includes a first electrode catalyst layer joined to one surface of the electrolyte membrane 40, and a first gas diffusion layer stacked on the first electrode catalyst layer. The cathode 44 includes a second electrode catalyst layer joined to the other surface of the electrolyte membrane 40, and a second gas diffusion layer stacked on the second electrode catalyst layer.

At one end of the fuel cell 12 in a longitudinal direction indicated by an arrow B (horizontal direction in FIG. 2), one oxygen-containing gas supply passage 34a (reactant gas supply passage), a plurality of coolant discharge passages 36b, and a plurality of fuel gas discharge passages 38b (e.g., two fuel gas discharge passages 38b in the embodiment of the present invention) (reactant gas discharge passages) are provided. The oxygen-containing gas supply passage 34a, the coolant discharge passages 36b, and the fuel gas discharge passages 38b extend through the fuel cell 12 in the stacking direction. The oxygen-containing gas supply passage 34a, the plurality of coolant discharge passages 36b, and the plurality of fuel gas discharge passages 38b extend through the stack body 14, the insulator 18a, and the end plate 20a in the stacking direction. (The oxygen-containing gas supply passage 34a, the plurality of coolant discharge passages 36b, and the plurality of fuel gas discharge passages 38b may extend through the terminal plate 16a.)

These fluid passages are arranged in the vertical direction at substantially equal intervals. A fuel gas such as a hydrogen gas (one of reactant gases) is discharged through the fuel gas discharge passages 38b. An oxygen-containing gas (the other of reactant gases) is supplied through the oxygen-containing gas supply passage 34a. A coolant is discharged through the coolant discharge passages 36b.

The oxygen-containing gas supply passage 34a is positioned between the two coolant discharge passages 36b that are provided vertically at a distance. A plurality of fuel gas discharge passages 38b include an upper fuel gas discharge passage 38b1 (upper reactant gas discharge passage) and a lower fuel gas discharge passage 38b2 (lower reactant gas discharge passage). The upper fuel gas discharge passage 38b1 is positioned above the upper coolant discharge passage 36b. The lower fuel gas discharge passage 38b2 is positioned below the lower coolant discharge passage 36b. That is, the lower fuel gas discharge passage 38b2 is positioned below the upper fuel gas discharge passage 38b1.

At the other end of the fuel cell 12 in a longitudinal direction indicated by the arrow B, one fuel gas supply passage 38a (reactant gas supply passage), a plurality of coolant supply passages 36a, and a plurality of oxygen-containing gas discharge passages 34b (e.g., two oxygen-containing gas discharge passages 34b in the embodiment of the present invention) (reactant gas discharge passages) are provided. The fuel gas supply passage 38a, the coolant supply passages 36a, and the oxygen-containing gas discharge passages 34b extend through the fuel cell 12 in the stacking direction. The fuel gas supply passage 38a, the plurality of coolant supply passages 36a, and the plurality of oxygen-containing gas discharge passages 34b extend through the stack body 14, the insulator 18a, and the end plate 20a in the stacking direction. The fuel gas supply passage 38a, the plurality of coolant supply passages 36a, and the plurality of oxygen-containing gas discharge passages 34b may extend through the terminal plate 16a.

These fluid passages are arranged in the vertical direction at substantially equal intervals. The fuel gas is supplied through the fuel gas supply passage 38a. The coolant is supplied through the coolant supply passages 36a. The oxygen-containing gas is discharged through the oxygen-containing gas discharge passage 34b.

The fuel gas supply passage 38a is positioned between the two coolant supply passages 36a that are provided vertically at a distance. A plurality of oxygen-containing gas discharge passages 34b include an upper oxygen-containing gas discharge passage 34b1 (upper reactant gas discharge passage) and a lower oxygen-containing gas discharge passage 34b2 (lower reactant gas discharge passage). The upper oxygen-containing gas discharge passage 34b1 is positioned above the upper coolant supply passage 36a. The lower oxygen-containing gas discharge passage 34b2 is positioned below the lower coolant supply passage 36a. That is, the lower oxygen-containing gas discharge passage 34b2 is positioned below the upper oxygen-containing gas discharge passage 34b1.

The layout of the oxygen-containing gas supply passage 34a, the plurality of oxygen-containing gas discharge passages 34b, the fuel gas supply passage 38a, and the plurality of fuel gas discharge passages 38b is not limited to the above embodiment, and may be changed as necessary depending on the required specification. Each of the oxygen-containing gas supply passage 34a, the upper oxygen-containing gas discharge passage 34b1, the lower oxygen-containing gas discharge passage 34b2, the coolant supply passages 36a, the coolant discharge passages 36b, the fuel gas supply passage 38a, the upper fuel gas discharge passage 38b1, and the lower fuel gas discharge passage 38b2 has a rectangular shape (square shape in FIGS. 2 to 4) in a plan view as viewed in the direction indicated by the arrow A.

As shown in FIG. 1, the oxygen-containing gas supply passage 34a, the coolant supply passages 36a, and the fuel gas supply passage 38a are connected to inlets 35a, 37a, 39a provided in the end plate 20a. Further, the upper oxygen-containing gas discharge passage 34b1, the lower oxygen-containing gas discharge passage 34b2, the coolant discharge passages 36b, the upper fuel gas discharge passage 38b1, and the lower fuel gas discharge passage 38b2 are connected to outlets 35b1, 35b2, 37b, 39b1, 39b2 provided in the end plate 20a.

As shown in FIG. 2, at one end of the resin frame member 46 in the direction indicated by the arrow B, the one oxygen-containing gas supply passage 34a, the plurality of coolant discharge passages 36b, and the plurality of fuel gas discharge passages 38b (e.g., two fuel gas discharge passages 38b as in the case of the embodiment of the present invention) are provided. At the other end of the resin frame member 46 in the direction indicated by the arrow B, the one fuel gas supply passage 38a, the plurality of coolant supply passages 36a, and the plurality of oxygen-containing gas discharge passages 34b (e.g., two oxygen-containing gas discharge passages 34b as in the case of the embodiment of the present invention) are provided.

Instead of using the resin frame member 46, the electrolyte membrane 40 may protrude outward. Further, frame shaped films may be provided on both sides of the electrolyte membrane 40 which protrude outward.

Figure 3:
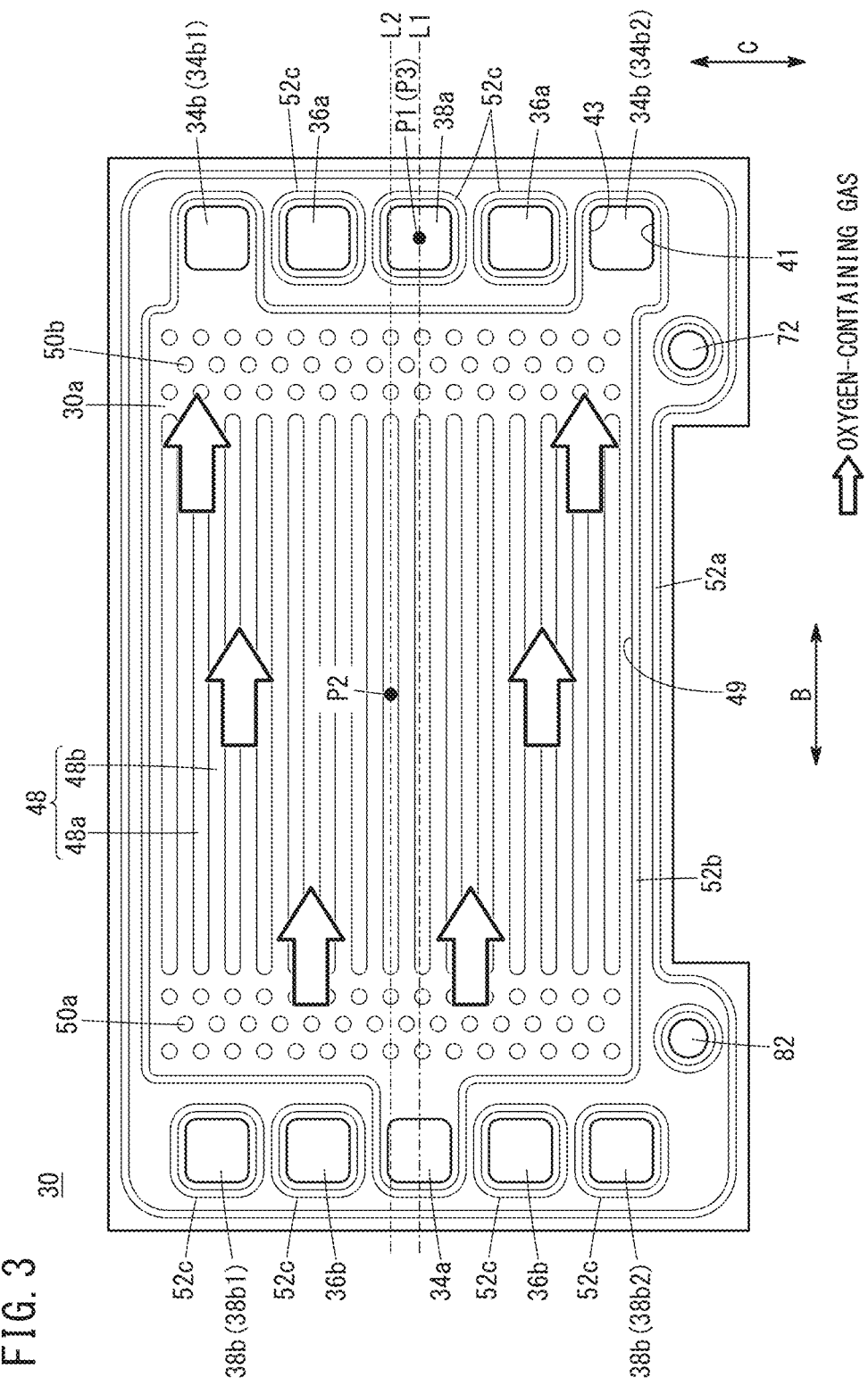
FIG. 3 is a view showing structure of a first metal separator as viewed from a side where an oxygen-containing gas flow field is present.

As shown in FIG. 3, the first metal separator 30 has an oxygen-containing gas flow field 48 (reactant gas flow field) on its surface 30a facing the resin frame equipped MEA 28. The oxygen-containing gas flows through the oxygen-containing gas flow field 48 along the electrode surface in the horizontal direction indicated by the arrow B. One end of the oxygen-containing gas flow field 48 in the direction indicated by the arrow B is connected to (in fluid communication with) the oxygen-containing gas supply passage 34a, and the other end of the oxygen-containing gas flow field 48 in the direction indicated by the arrow B is connected to (in fluid communication with) the oxygen-containing gas discharge passage 34b. The oxygen-containing gas flow field 48 includes a plurality of ridges 48a extending in the direction indicated by the arrow B and arranged in the gravity direction indicated by the arrow C, and includes straight (or wavy) oxygen-containing gas flow grooves 48b (reactant gas flow grooves) between the ridges 48a.

An inlet buffer 50a is provided by press forming between the oxygen-containing gas supply passage 34a and the oxygen-containing gas flow field 48. The inlet buffer 50a includes a plurality of bosses. An outlet buffer 50b is provided by press forming between the oxygen-containing gas discharge passages 34b and the oxygen-containing gas flow field 48. The outlet buffer 50b includes a plurality of bosses.

A plurality of metal bead seals are formed on the surface 30a of the first metal separator 30 by press forming. The metal bead seals are expanded toward the resin frame equipped MEA 28. Instead of the metal bead seals, ridge shaped elastic seals made of elastic material may be provided. The plurality of metal bead seals include an outer bead 52a, an inner bead 52b, and a plurality of passage bead 52c. The outer bead 52a is provided along the outer marginal portion of the surface 30a. The inner bead 52b is provided around the oxygen-containing gas flow field 48, the oxygen-containing gas supply passage 34a, and the oxygen-containing gas discharge passages 34b while allowing the oxygen-containing gas flow field 48 to be connected to the oxygen-containing gas supply passage 34a and the oxygen-containing gas discharge passages 34b.

The plurality of passage beads 52c are provided around the fuel gas supply passage 38a, the fuel gas discharge passages 38b, the coolant supply passages 36a, and the coolant discharge passages 36b, respectively. The outer bead 52a may be provided as necessary. The outer bead 52a may be dispensed with.

Figure 4:
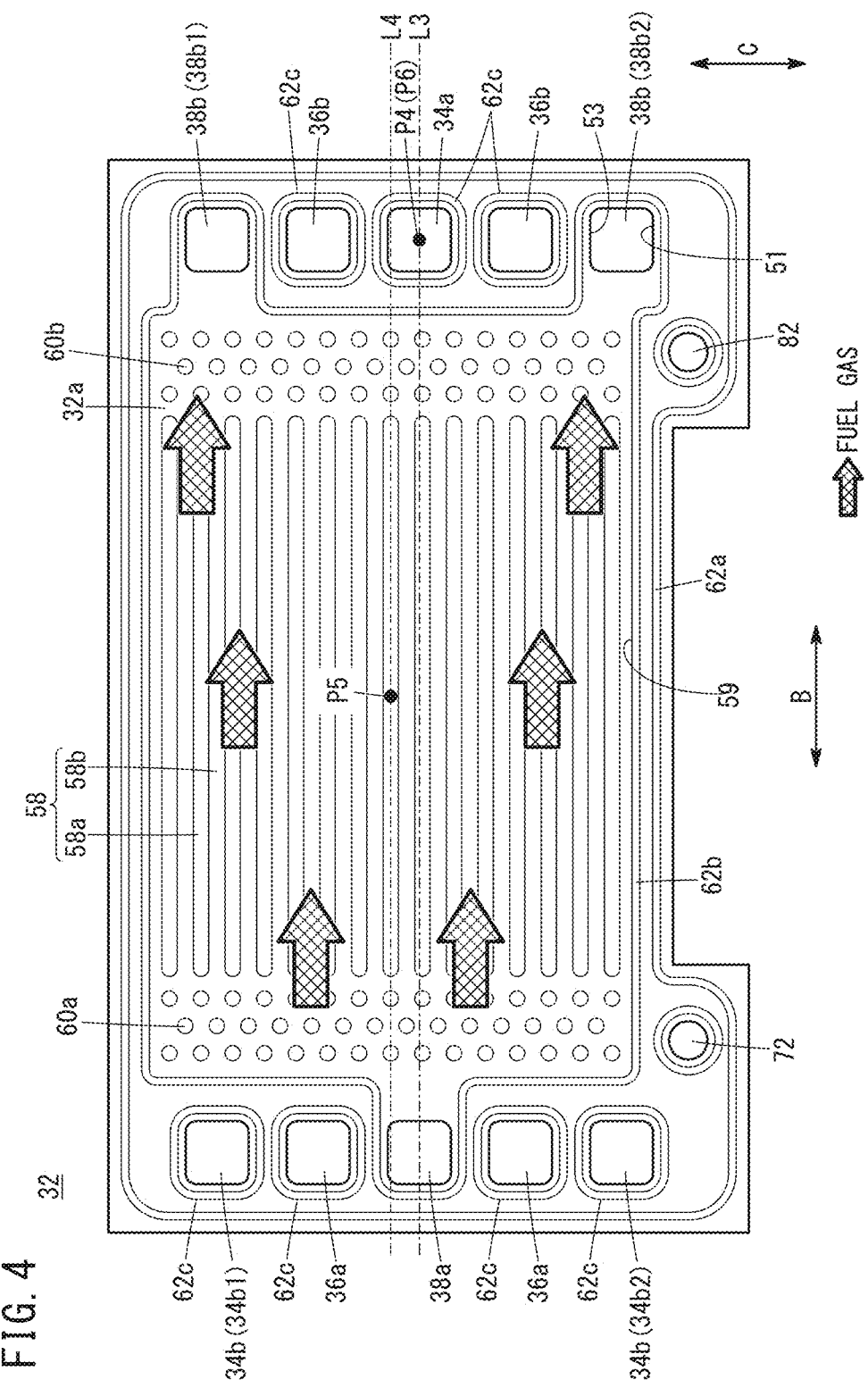
FIG. 4 is a view showing structure of a second metal separator as viewed from a side where a fuel gas flow field is present.

As shown in FIG. 4, the second metal separator 32 has a fuel gas flow field 58 (reactant gas flow field) on its surface 32a facing the resin frame equipped MEA 28. The fuel gas flows through the fuel gas flow field 58 along the electrode surface in the horizontal direction indicated by the arrow B. One end of the fuel gas flow field 58 in the direction indicated by the arrow B is connected to (in fluid communication with) the fuel gas supply passage 38a, and the other end of the fuel gas flow field 58 in the direction indicated by the arrow B is connected to (in fluid communication with) the fuel gas discharge passages 38b. The fuel gas flow field 58 includes a plurality of ridges 58a extending in the direction indicated by the arrow B and arranged in the gravity direction indicated by the arrow C, and includes straight (or wavy) fuel gas flow grooves 58b (reactant gas flow grooves) between the ridges 58a.

An inlet buffer 60a is provided by press forming between the fuel gas supply passage 38a and the fuel gas flow field 58. The inlet buffer 60a includes a plurality of bosses. An outlet buffer 60b is provided by press forming between the fuel gas discharge passages 38b and the fuel gas flow field 58. The outlet buffer 60b includes a plurality of bosses.

A plurality of metal bead seals are formed on the surface 32a of the second metal separator 32 by press forming. The metal bead seals are expanded toward the resin frame equipped MEA 28. Instead of the metal bead seals, ridge shaped elastic seals made of elastic material may be provided. The plurality of metal bead seals include an outer bead 62a, an inner bead 62b, and a plurality of passage beads 62c. The outer bead 62a is provided along the outer marginal portion of the surface 32a. The inner bead 62b is provided inside the outer bead 62a, around the fuel gas flow field 58, the fuel gas supply passage 38a, and the fuel gas discharge passages 38b while allowing the fuel gas flow field 58 to be connected to the fuel gas supply passage 38a and the fuel gas discharge passages 38b.

The plurality of passage beads 62c are provided around the oxygen-containing gas supply passage 34a, the oxygen-containing gas discharge passages 34b, the coolant supply passages 36a, and the coolant discharge passages 36b, respectively. The outer bead 62a may be provided as necessary. The outer bead 62a may be dispensed with.

As shown in FIG. 3, in the first metal separator 30, a central point P1 at the center between the lower end of the upper oxygen-containing gas discharge passage 34b1 and the upper end of the lower oxygen-containing gas discharge passage 34b2 (a point spaced by the equal distance from both ends) is positioned below a center P2 of the oxygen-containing gas flow field 48 in the width direction (gravity direction indicated by the arrow C). Stated otherwise, a first horizontal line L1 passing through the central point P1 is positioned below a second horizontal line L2 passing through the center P2. The first horizontal line L1 passes through a center P3 of the fuel gas supply passage 38a.

The central point P1 may be a point at the center between the center of figure (center) of the upper oxygen-containing gas discharge passage 34b1 and the center of figure of the lower oxygen-containing gas discharge passage 34b2 (a point spaced by the equal distance from both points). Preferably, the upper oxygen-containing gas discharge passage 34b1 and the lower oxygen-containing gas discharge passage 34b2 have the same shape.

In the lower oxygen-containing gas discharge passage 34b2, the entire bottom surface 41 of the lower oxygen-containing gas discharge passage 34b2 is positioned below a bottom surface 49 of the oxygen-containing gas flow groove 48b at the lowermost position. The bottom surface 49 is formed by the upper surface of the inner bead 52b. It should be noted that the bottom surface 49 may be formed by the upper surface of the ridge 48a at the lowermost position. In the lower oxygen-containing gas discharge passage 34b2, an entire upper surface 43 of the lower oxygen-containing gas discharge passage 34b2 is positioned above the bottom surface 49 of the oxygen-containing gas flow groove 48b at the lowermost position. That is, the bottom surface 49 of the oxygen-containing gas flow groove 48b at the lowermost position is positioned between the bottom surface 41 and the upper surface 43 of the lower oxygen-containing gas discharge passage 34b2 in the gravity direction indicated by the arrow C.

As shown in FIG. 4, in the second metal separator 32, a central point P4 at the center between the lower end of the upper fuel gas discharge passage 38b1 and the upper end of the lower fuel gas discharge passage 38b2 (a point spaced by the equal distance from both ends) is positioned below a center P5 of the fuel gas flow field 58 in the width direction (gravity direction indicated by the arrow C). Stated otherwise, a third horizontal line L3 passing through the central point P4 is positioned below a fourth horizontal line L4 passing through the center P5. The third horizontal line L3 passes through a center P6 of the oxygen-containing gas supply passage 34a.

The central point P4 may be a point at the center between the center of figure (center) of the upper fuel gas discharge passage 38b1 and the center of figure (center) of the lower fuel gas discharge passage 38b2 (a point spaced by the equal distance from both points). Preferably, the upper fuel gas discharge passage 38b1 and the lower fuel gas discharge passage 38b2 have the same shape.

In the lower fuel gas discharge passage 38b2, an entire bottom surface 51 of the lower fuel gas discharge passage 38b2 is positioned below a bottom surface 59 of the fuel gas flow groove 58b at the lowermost position. The bottom surface 59 is formed by the upper surface of the inner bead 62b. The bottom surface 59 may be formed by the upper surface of the ridge 58a at the lowermost position. In the lower fuel gas discharge passage 38b2, an entire upper surface 53 of the lower fuel gas discharge passage 38b2 is positioned above the bottom surface 59 of the fuel gas flow groove 58b at the lowermost position. That is, the bottom surface 59 of the fuel gas flow groove 58b at the lowermost position is positioned between the bottom surface 51 and the upper surface 53 of the lower fuel gas discharge passage 38b2 in the gravity direction (indicated by the arrow C).

As shown in FIG. 2, a coolant flow field 66 is formed between a surface 30b of the first metal separator 30 and a surface 32b of the second metal separator 32 that are joined together by welding or brazing. The coolant flow field 66 is connected to (in fluid communication with) the coolant supply passages 36a and the coolant discharge passages 36b. When the first metal separator 30 and the second metal separator 32 are stacked together, the coolant flow field 66 is formed between the back surface of the first metal separator 30 on which the oxygen-containing gas flow field 48 is formed, and the back surface of the second metal separator 32 on which the fuel gas flow field 58 is formed.

Figure 5:
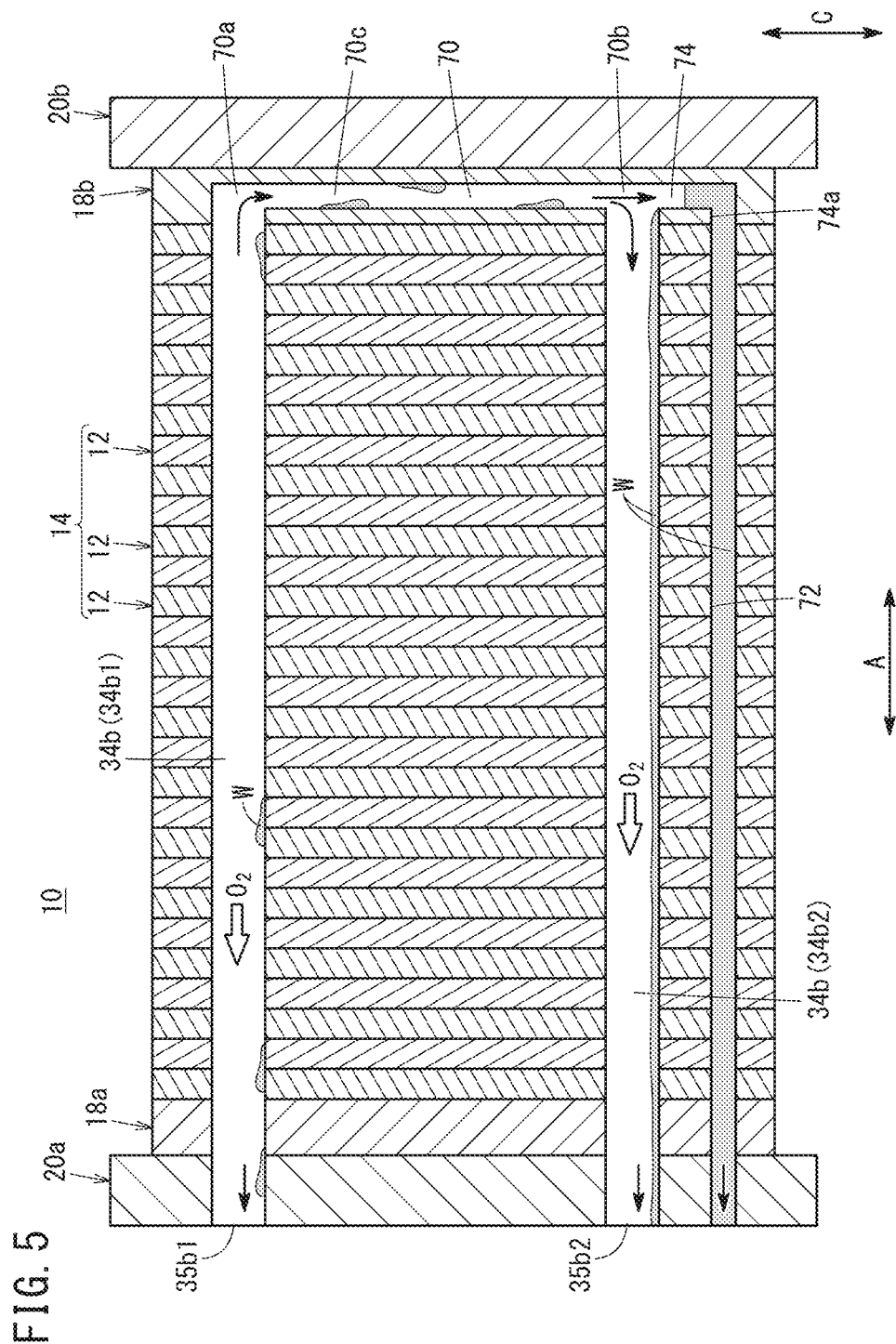
FIG. 5 is a cross sectional view schematically showing the fuel cell stack, in a surface including a plurality of oxygen-containing gas discharge passages.

As shown in FIG. 5, the upper oxygen-containing gas discharge passage 34b1 and the lower oxygen-containing gas discharge passage 34b2 are connected together by a first connection channel 70 at ends (deep ends) opposite to the outlets 35b1, 35b2. That is, the first connection channel 70 connects the end of the upper oxygen-containing gas discharge passage 34b1 opposite to the flow direction of the oxygen-containing gas and the end of the lower oxygen-containing gas discharge passage 34b2 opposite to the flow direction of the oxygen-containing gas. In FIG. 5, for ease of understanding, the fuel gas supply passage 38a and the coolant supply passages 36a (FIG. 2) are not shown. In the embodiment of the present invention, the first connection channel 70 is provided in the insulator 18b.

Specifically, the first connection channel 70 extends vertically in the insulator 18b. The first connection channel 70 includes a first upper passage connector part 70a adjacent to the upper oxygen-containing gas discharge passage 34b1, a first lower passage connector part 70b adjacent to the lower oxygen-containing gas discharge passage 34b2, and a first intermediate part 70c connecting the first upper passage connector part 70a and the first lower passage connector part 70b.

Instead of adopting structure of the embodiment of the present invention, the first connection channel 70 may be provided in the terminal plate 16b or the end plate 20b. Alternatively, the first connection channel 70 may be provided in a connection channel member provided outside the insulator 18b and the end plate 20b.

The fuel cell stack 10 has a first drain 72 for discharging water W produced at the cathode in the fuel cell stack 10 during operation (power generation) of the fuel cell stack 10. A seal 72a (see FIG. 2) is provided around the first drain 72. The first drain 72 extends through the fuel cell stack 10 in the stacking direction indicated by the arrow A, and the first drain 72 is connected to the first connection channel 70.

A first relay channel 74 is provided for the fuel cell stack 10. The first relay channel 74 allows the first connection channel 70 and the first drain 72 to be in fluid communication with each other. The first relay channel 74 includes a first drain connector part 74a adjacent to the first drain 72. In the embodiment of the present invention, the first relay channel 74 is provided in the insulator 18b. In the case where the first connection channel 70 is provided in the end plate 20b, preferably, the first relay channel 74 is provided in the end plate 20b as well. The first connection channel 70 and the first relay channel 74 may be provided respectively in the insulator 18b and the end plate 20b, separately from each other.

As shown in FIG. 3, the first drain 72 is provided inside the lower oxygen-containing gas discharge passage 34b2 in the horizontal direction (indicated by the arrow B) perpendicular to the stacking direction. As shown in FIG. 5, the first relay channel 74 is connected to the lowermost position of the first connection channel 70, and the first relay channel 74 extends downward from the first connection channel 70, toward the first drain 72. The first drain 72 is positioned below the lower oxygen-containing gas discharge passage 34b2.

Figure 6:
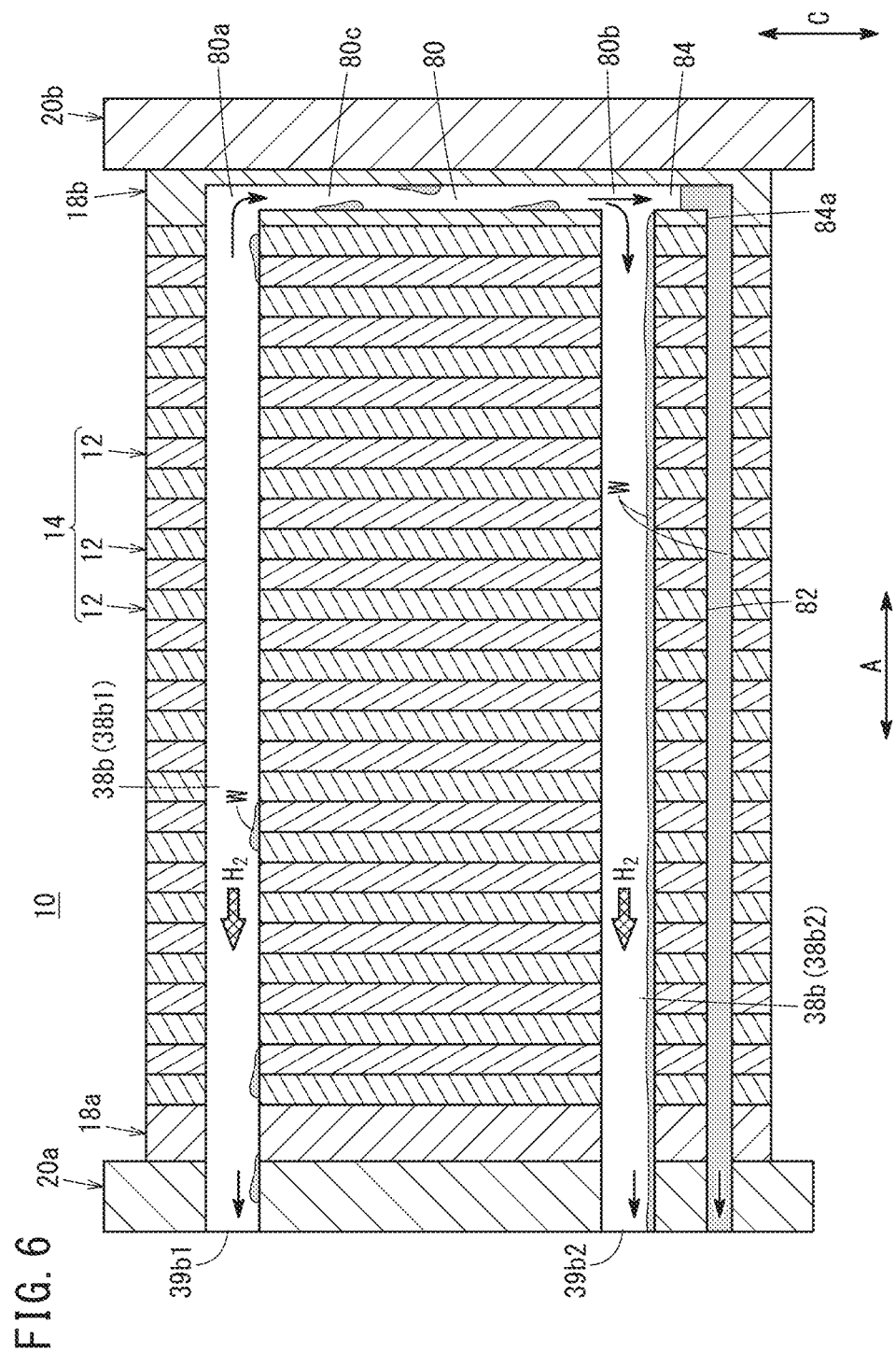
FIG. 6 is a cross sectional view showing the fuel cell stack, in a surface including a plurality of fuel gas discharge passages.

As shown in FIG. 6, the upper fuel gas discharge passage 38b1 and the lower fuel gas discharge passage 38b2 are connected together by a second connection channel 80 at the ends (deep ends) opposite to the outlets 39b1, 39b2. That is, the second connection channel 80 connects the end of the upper fuel gas discharge passage 38b1 opposite to the flow direction of the fuel gas and the end of the lower fuel gas discharge passage 38b2 opposite to the flow direction of the fuel gas together. In FIG. 6, for ease of understanding, the oxygen-containing gas supply passage 34a and the coolant discharge passages 36b (FIG. 2) are not shown. In the embodiment of the present invention, the second connection channel 80 is provided in the insulator 18b.

Specifically, the second connection channel 80 extends vertically in the insulator 18b. The second connection channel 80 includes a second upper passage connector part 80a adjacent to the upper fuel gas discharge passage 38b1, a second lower passage connector part 80b adjacent to the lower fuel gas discharge passage 38b2, and a second intermediate part 80c connecting the second upper passage connector part 80a and the second lower passage connector part 80b.

Instead of adopting structure of the embodiment of the present invention, the second connection channel 80 may be provided in the terminal plate 16b or the end plate 20b. Alternatively, the second connection channel 80 may be provided in a connection channel member provided outside the insulator 18b and the end plate 20b.

The fuel cell stack 10 has a second drain 82 for discharging water W produced at the anode in the fuel cell stack 10 during operation (power generation) of the fuel cell stack 10. A seal 82a (see FIG. 2) is provided around the second drain 82. The second drain 82 extends through the fuel cell stack 10 in the stacking direction indicated by the arrow A, and the second drain 82 is connected to the second connection channel 80.

A second relay channel 84 is formed in the fuel cell stack 10. The second relay channel 84 allows the second connection channel 80 and the second drain 82 to be in fluid communication with each other. The second relay channel 84 includes a second drain connector part 84a adjacent to the second drain 82. In the embodiment of the present invention, the second relay channel 84 is provided in the insulator 18b. In the case where the second connection channel 80 is provided in the end plate 20b, preferably, the second relay channel 84 is provided in the end plate 20b as well. The second connection channel 80 and the second relay channel 84 may be provided respectively in the insulator 18b and the end plate 20b, separately from each other.

As shown in FIG. 4, the second drain 82 is provided inside the lower fuel gas discharge passage 38b2 in the horizontal direction (indicated by the arrow B) perpendicular to the stacking direction. As shown in FIG. 6, the second relay channel 84 is connected to the lowermost position of the second connection channel 80, and the second relay channel 84 extends downward from the second connection channel 80, toward the second drain 82. The second drain 82 is positioned below the lower fuel gas discharge passage 38*b*2.

It should be noted that only one of the first connection channel 70 and the second connection channel 80 may be provided. Further, only one of the first drain 72 and the second drain 82 may be provided.

Operation of the fuel cell stack 10 having the above structure will be described below.

Firstly, as shown in FIG. 1, an oxygen-containing gas such as air is supplied to the oxygen-containing gas supply passage 34*a* (inlet 35*a*) of the end plate 20*a*. A fuel gas such as the hydrogen-containing gas is supplied to the fuel gas supply passage 38*a* (inlet 39*a*) of the end plate 20*a*. A coolant such as pure water, ethylene glycol, oil is supplied to the coolant supply passages 36*a* (inlets 37*a*) of the end plate 20*a*.

As shown in FIGS. 2 and 3, the oxygen-containing gas flows from the oxygen-containing gas supply passage 34*a* into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28*a*.

In the meanwhile, as shown in FIGS. 2 and 4, the fuel gas flows from the fuel gas supply passage 38*a* into the fuel gas flow field 58 of the second metal separator 32. The fuel gas flows along the fuel gas flow field 58 in the direction indicated by the arrow B, the fuel gas is supplied to the anode 42 of the MEA 28*a*.

Thus, in each MEA 28*a*, the oxygen-containing gas supplied to the cathode 44 and the fuel gas supplied to the anode 42 are partially consumed in electrochemical reactions in the second electrode catalyst layer and the first electrode catalyst layer to generate electricity.

Then, the oxygen-containing gas supplied to the cathode 44 is partially consumed at the cathode 44, and the oxygen-containing gas flows separately into the upper oxygen-containing gas discharge passage 34*b*1 and the lower oxygen-containing gas discharge passage 34*b*2. Then, the oxygen-containing gas is discharged in the direction indicated by the arrow A. Likewise, the fuel gas supplied to the anode 42 is partially consumed at the anode 42, and the fuel gas flows separately into the upper fuel gas discharge passage 38*b*1 and the lower fuel gas discharge passage 38*b*2. Then, the fuel gas is discharged in the direction indicated by the arrow A.

Further, as shown in FIG. 2, the coolant supplied to the coolant supply passages 36*a* flows into the coolant flow field 66 formed between the first metal separator 30 and the second metal separator 32, and then, the coolant flows in the direction indicated by the arrow B. After the coolant cools the MEA 28*a*, the coolant is discharged from the coolant discharge passages 36*b*.

In this case, the fuel cell stack 10 according to the embodiment of the present invention offers the following advantages.

In the fuel cell stack 10, the first metal separator 30 has structure where the central point P1 at the center between the upper oxygen-containing gas discharge passage 34*b*1 and the lower oxygen-containing gas discharge passage 34*b*2 is positioned below the center P2 of the oxygen-containing gas flow field 48 in the gravity direction (see FIG. 3).

In the structure, in comparison with the case where the central point P1 at the center between the upper oxygen-containing gas discharge passage 34*b*1 and the lower oxygen-containing gas discharge passage 34*b*2 is positioned at the same height as the center P2 of the oxygen-containing gas flow field 48 in the gravity direction, it is possible to provide the lower oxygen-containing gas discharge passage 34*b*2 at a lower position, without increasing the distance between the upper oxygen-containing gas discharge passage 34*b*1 and the lower oxygen-containing gas discharge passage 34*b*2. In this manner, it is possible to smoothly discharge the water W produced in the oxygen-containing gas flow field 48 into the lower oxygen-containing gas discharge passage 34*b*2.

The second metal separator 32 has structure where the central point P4 at the center between the upper fuel gas discharge passage 38*b*1 and the lower fuel gas discharge passage 38*b*2 is positioned below the center P5 of the fuel gas flow field 58 in the gravity direction (see FIG. 4).

In the structure, in comparison with the case where the central point P4 at the center between the upper fuel gas discharge passage 38*b*1 and the lower fuel gas discharge passage 38*b*2 is positioned at the same height as the center P5 of the fuel gas flow field 58 in the gravity direction, it is possible to provide the lower fuel gas discharge passage 38*b*2 at a lower position, without increasing the distance between the upper fuel gas discharge passage 38*b*1 and the lower fuel gas discharge passage 38*b*2. Accordingly, it is possible to smoothly discharge the water W produced in the fuel gas flow field 58 into the lower fuel gas discharge passage 38*b*2.

Thus, without increasing the size of the fuel cell 12, it is possible to suppress stagnation of the produced water W at the lower position of the oxygen-containing gas flow field 48 and at the lower position of the fuel gas flow field 58.

The oxygen-containing gas in the oxygen-containing gas flow field 48 is discharged from both of the upper oxygen-containing gas discharge passage 34*b*1 and the lower oxygen-containing gas discharge passage 34*b*2. The fuel gas in the fuel gas flow field 58 is discharged from both of the upper fuel gas discharge passage 38*b*1 and the lower fuel gas discharge passage 38*b*2. Therefore, the oxygen-containing gas can flow the oxygen-containing gas flow field 48 smoothly, and the fuel gas can flow the fuel gas flow field 58 smoothly. Accordingly, it is possible to suppress decrease in the power generation performance due to shortage in the supply of the oxygen-containing gas and the fuel gas.

The entire bottom surface 41 of the lower oxygen-containing gas discharge passage 34*b*2 is positioned below the bottom surface 49 of the oxygen-containing gas flow grooves 48*b* at the lowermost position. Therefore, since the produced water W can be stored in the lower oxygen-containing gas discharge passage 34*b*2, it is possible to suppress overflow (backflow) of the produced water W from the lower oxygen-containing gas discharge passage 34*b*2 into the oxygen-containing gas flow field 48. Thus, it is possible to suppress stagnation of the produced water W at the lower position of the oxygen-containing gas flow field 48.

The entire bottom surface 51 of the lower fuel gas discharge passage 38*b*2 is positioned below the bottom surface 59 of the fuel gas flow groove 58*b* at the lowermost position. Therefore, since the produced water W can be stored in the lower fuel gas discharge passage 38*b*2, it is possible to suppress overflow (backflow) of the produced water W from the lower fuel gas discharge passage 38*b*2 into the fuel gas flow field 58. Thus, it is possible to suppress stagnation of the produced water W at the lower position of the fuel gas flow field 58.

The upper surface 43 of the lower oxygen-containing gas discharge passage 34b2 is positioned above the bottom surface 49 of the oxygen-containing gas flow grooves 48b at the lowermost position. Further, the upper surface 53 of the lower fuel gas discharge passage 38b2 is positioned above the bottom surface 59 of the fuel gas flow groove 58b at the lowermost position. In this manner, it is possible to suppress increase in the size of the fuel cell 12.

The first connection channel 70 is provided in the insulator 18b of the fuel cell stack 10. The first connection channel 70 connects the end of the upper oxygen-containing gas discharge passage 34b1 opposite to the flow direction of the oxygen-containing gas and the end of the lower oxygen-containing gas discharge passage 34b2 opposite to the flow direction of the oxygen-containing gas. The second connection channel 80 is provided in the insulator 18b of the fuel cell stack 10. The second connection channel 80 connects the end of the upper fuel gas discharge passage 38b1 opposite to the flow direction of the fuel gas and the end of the lower fuel gas discharge passage 38b2 opposite to the flow direction of the fuel gas.

As shown in FIG. 5, the produced water W which tends to be stagnant at the end of the upper oxygen-containing gas discharge passage 34b1 opposite to the flow direction of the oxygen-containing gas flows into the lower oxygen-containing gas discharge passage 34b2 through the first connection channel 70, and the produced water W is discharged to the outside. Further, as shown in FIG. 6, the produced water W which tends to be stagnant at the end of the upper fuel gas discharge passage 38b1 opposite to the flow direction of the fuel gas flows into the lower fuel gas discharge passage 38b2 through the second connection channel 80, and the produced water W is discharged to the outside.

Thus, in the fuel cell stack 10, it is possible to reduce the quantity of, or eliminate the produced water W (stagnant water) at the end of the upper oxygen-containing gas discharge passage 34b1 and the end of the upper fuel gas discharge passage 38b1. Accordingly, it is possible to suppress the decrease in the power generation performance of the fuel cell stack 10 to a greater extent.

The fuel cell stack 10 has the first drain 72 and the second drain 82 for discharging the produced water W to the outside. Further, the first drain 72 is connected to the first connection channel 70, and the second drain 82 is connected to the second connection channel 80. Therefore, since discharge of the produced water W is facilitated through the first drain 72 and the second drain 82, it is possible to effectively reduce the stagnant water, and prevent the occurrence of water stagnation.

The first drain 72 is positioned below the lower oxygen-containing gas discharge passage 34b2. The second drain 82 is positioned below the lower fuel gas discharge passage 38b2. Therefore, it is possible to effectively discharge the produced water W through the first drain 72 and the second drain 82.

Figure 7:
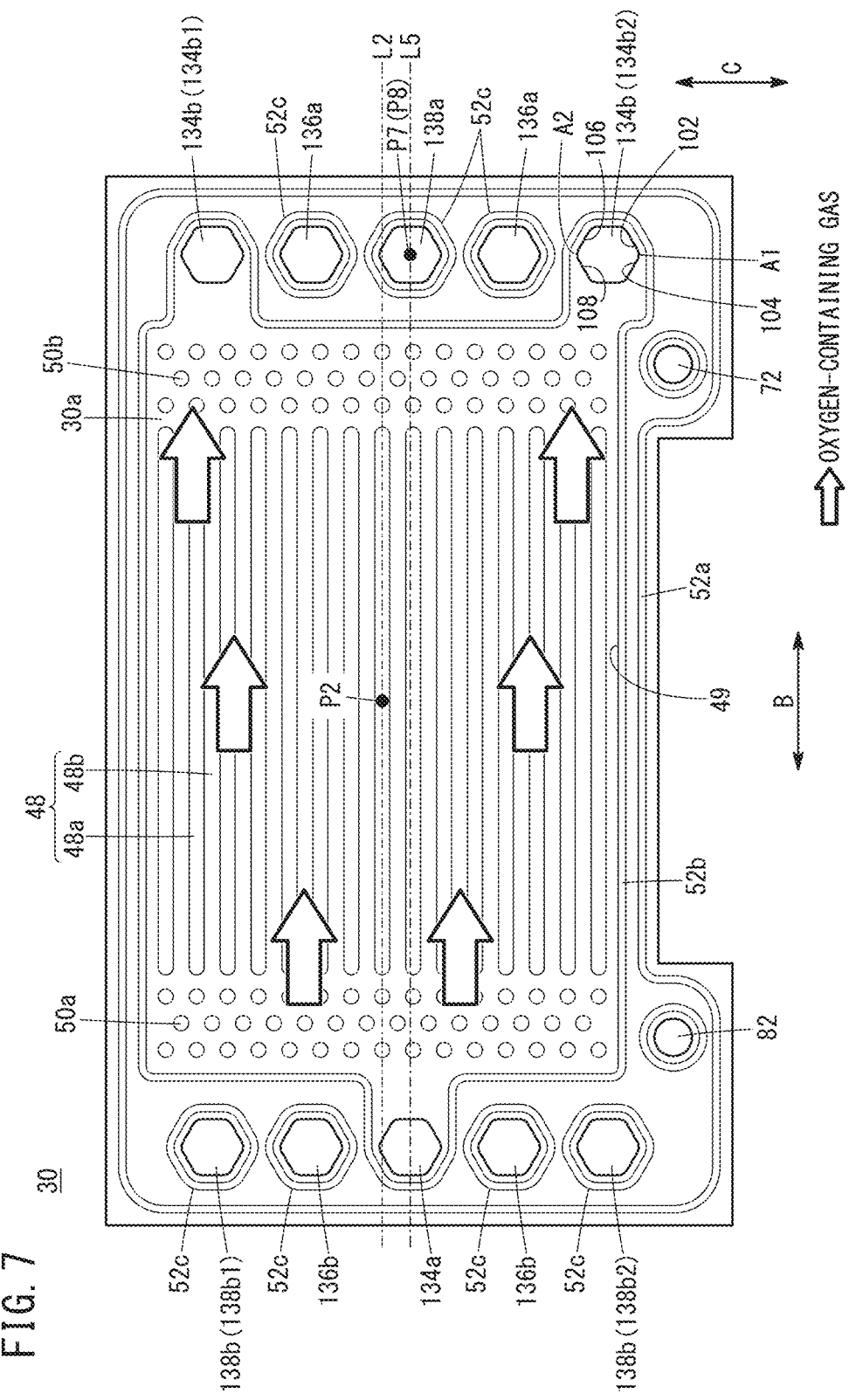
FIG. 7 is a view showing structure of a first metal separator having fluid passages according to a modified embodiment.
Figure 8:
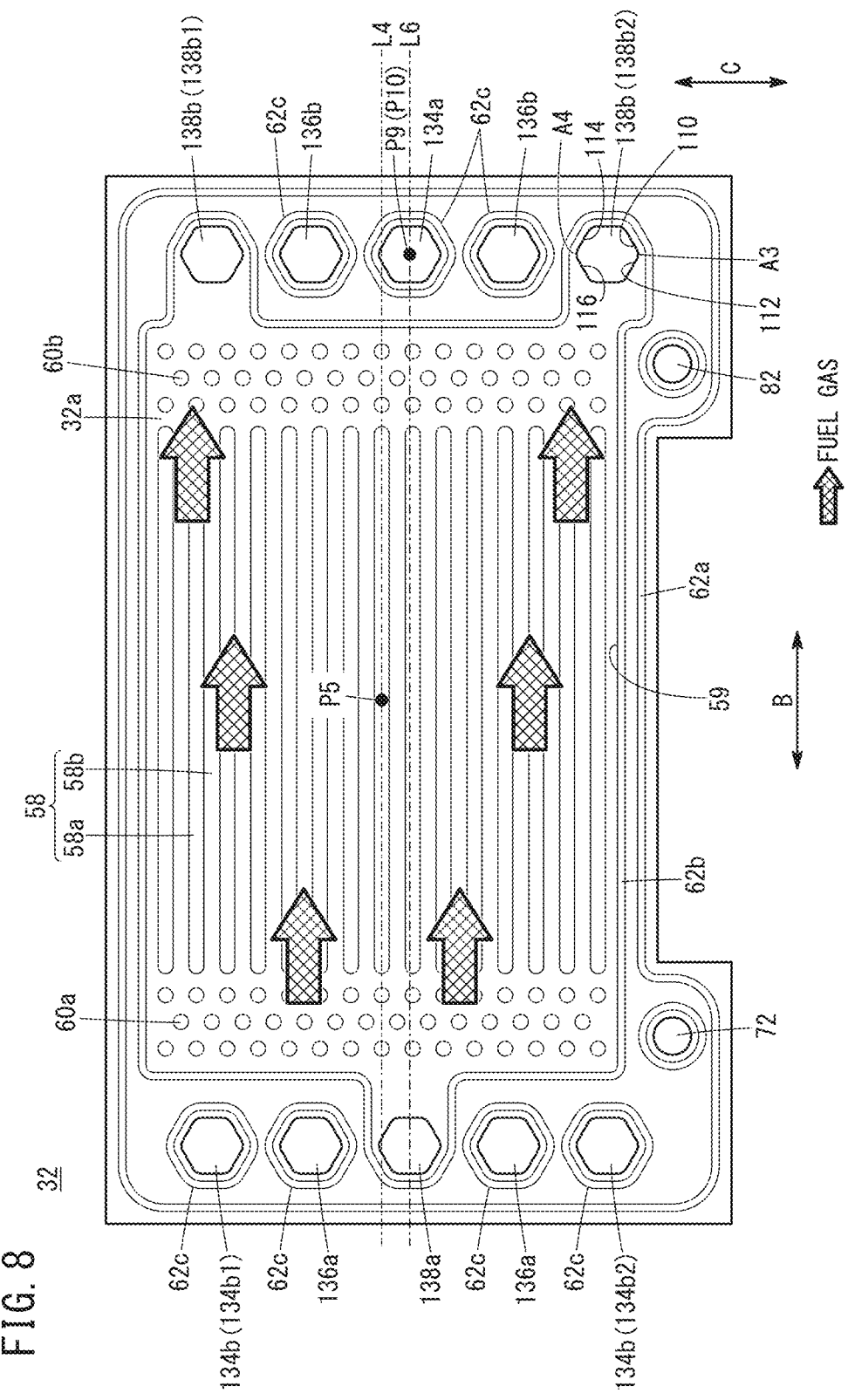
FIG. 8 is a view showing structure of a second metal separator having fluid passages according to the modified embodiment.

As shown in FIGS. 7 and 8, in the fuel cell stack 10, fluid passages (an oxygen-containing gas supply passage 134a, oxygen-containing gas discharge passages 134b, coolant supply passages 136a, coolant discharge passages 136b, a fuel gas supply passage 138a, and fuel gas discharge passages 138b) having a hexagonal shape in a plan view as viewed in the stacking direction (indicated by the arrow A) may be provided. It should be noted that the passage beads 52c, 62c have shapes corresponding to the fluid passages.

As shown in FIG. 7, the oxygen-containing gas discharge passages 134b include an upper oxygen-containing gas discharge passage 134b1 and a lower oxygen-containing gas discharge passage 134b2. The upper end and lower end of the lower oxygen-containing gas discharge passage 134b2 are positioned at vertices of the hexagon. Bottom surfaces 102, 104 of the lower oxygen-containing gas discharge passage 134b2 are provided on both of left and right sides of a lower vertex A1 of the lower oxygen-containing gas discharge passage 134b2, and upper surfaces 106, 108 of the lower oxygen-containing gas discharge passage 134b2 are positioned on both of left and right sides of an upper vertex A2 of the lower oxygen-containing gas discharge passage 134b2. The bottom surfaces 102, 104 and the upper surfaces 106, 108 are inclined from the horizontal direction (indicated by the arrow B).

In the lower oxygen-containing gas discharge passage 134b2, the entire bottom surfaces 102, 104 of the lower oxygen-containing gas discharge passage 134b2 are positioned below the bottom surface 49 of the oxygen-containing gas flow groove 48b at the lowermost position. In the lower oxygen-containing gas discharge passage 134b2, the upper surfaces 106, 108 of the lower oxygen-containing gas discharge passage 134b2 are positioned above the bottom surface 49 of the oxygen-containing gas flow groove 48b provided at the lowermost position. A central point P7 at the center between the lower end of the upper oxygen-containing gas discharge passage 134b1 and the upper end of the lower oxygen-containing gas discharge passage 134b2 (a point spaced by the equal distance from both ends) is positioned below the center P2. A fifth horizontal line L5 passing through the central point P7 passes through a center P8 of the fuel gas supply passage 138a.

The central point P7 may be a point at the center between the center of figure of the upper oxygen-containing gas discharge passage 134b1 and the center of figure of the lower oxygen-containing gas discharge passage 134b2 (a point spaced by the equal distance from both points).

As shown in FIG. 8, the fuel gas discharge passages 138b include an upper fuel gas discharge passage 138b1 and a lower fuel gas discharge passage 138b2. The upper end and lower end of the lower fuel gas discharge passage 138b2 are positioned at vertices of the hexagon. Bottom surfaces 110, 112 of the lower fuel gas discharge passage 138b2 are provided on both of left and right sides of a lower vertex A3 of the lower fuel gas discharge passage 138b2, and upper surfaces 114, 116 of the lower fuel gas discharge passage 138b2 are positioned on both of left and right sides of an upper vertex A4 of the lower fuel gas discharge passage 138b2. The bottom surfaces 110, 112 and the upper surfaces 114, 116 are inclined from the horizontal direction (indicated by the arrow B).

In the lower fuel gas discharge passage 138b2, the entire bottom surfaces 110, 112 of the lower fuel gas discharge passage 138b2 are positioned below the bottom surface 59 of the fuel gas flow groove 58b at the lowermost position. In the lower fuel gas discharge passage 138b2, the upper surfaces 114, 116 of the lower fuel gas discharge passage 138b2 are positioned above the bottom surface 59 of the fuel gas flow groove 58b at the lowermost position. A central point P9 at the center between the lower end of the upper fuel gas discharge passage 138b1 and the upper end of the lower fuel gas discharge passage 138b2 (a point spaced by the equal distance from both ends) is positioned below the center P5. A sixth horizontal line L6 passing through the central point P9 passes through a center P10 of the oxygen-containing gas supply passage 134a.

The central point P9 may be a point at the center between the center of figure (center) of the upper fuel gas discharge passage 138b1 and the center of figure (center) of the lower fuel gas discharge passage 138b2 (a point spaced by the equal distance from both points).

The bottom surfaces 102, 104 of the lower oxygen-containing gas discharge passage 134b2 are inclined from the horizontal direction. In this manner, it is possible to suppress increase in the size of the fuel cell stack 10, and provide the bottom surfaces 102, 104 of the lower oxygen-containing gas discharge passage 134b2 below the bottom surface 49 of the oxygen-containing gas flow groove 48b at the lowermost position. Further, the bottom surfaces 110, 112 of the lower fuel gas discharge passage 138b2 are inclined from the horizontal direction. In this manner, it is possible to suppress increase in the size of the fuel cell stack 10, and provide the bottom surfaces 110, 112 of the lower fuel gas discharge passage 138b2 below the bottom surface 59 of the fuel gas flow groove 58b at the lowermost position.

Figure 9:
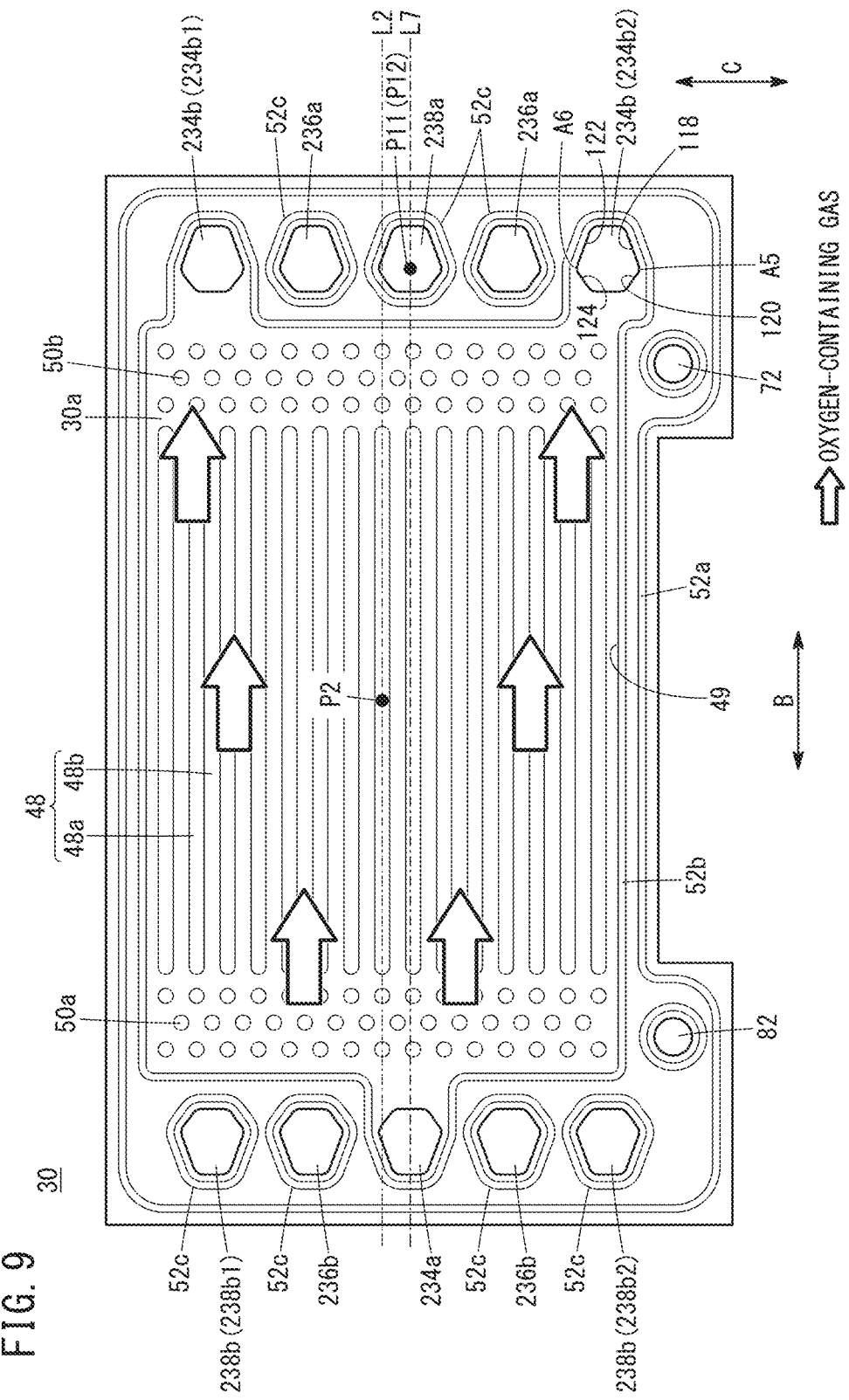
FIG. 9 is a view showing structure of a first metal separator having fluid passages according to another modified embodiment.
Figure 10:
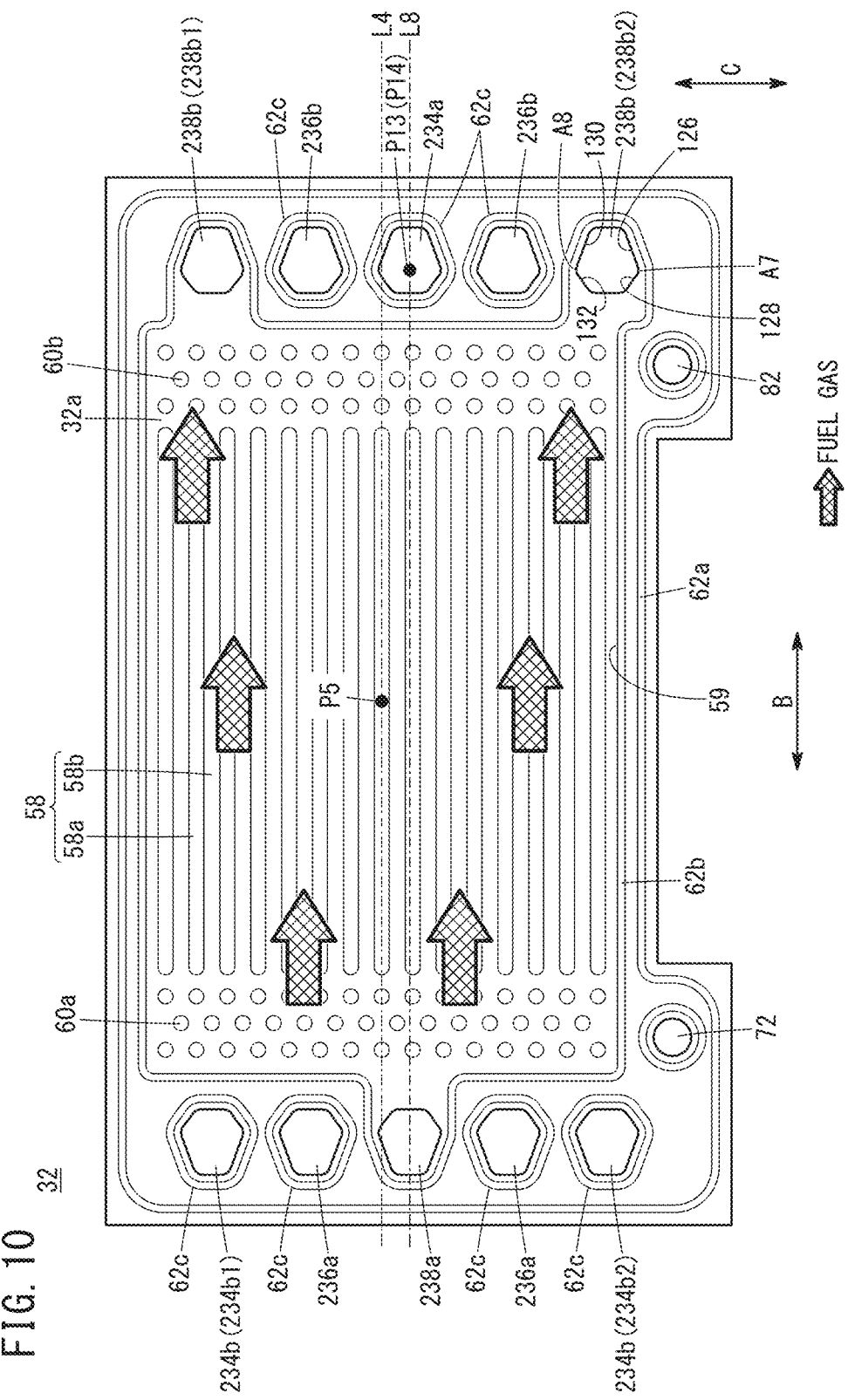
FIG. 10 is a view showing structure of a second metal separator having fluid passages according to the other modified embodiment.

As shown in FIGS. 9 and 10, in the fuel cell stack 10, a plurality of hexagonal fluid passages (an oxygen-containing gas supply passage 234a, oxygen-containing gas discharge passages 234b, coolant supply passages 236a, coolant discharge passages 236b, a fuel gas supply passage 238a, and fuel gas discharge passages 238b) elongated in the horizontal direction in a plan view as viewed in the stacking direction (indicated by the arrow A) may be provided. It should be noted that the passage beads 52c, 62c have shapes corresponding to the fluid passages.

As shown in FIG. 9, the oxygen-containing gas discharge passages 234b include an upper oxygen-containing gas discharge passage 234b1 and a lower oxygen-containing gas discharge passage 234b2. A bottom surface 118 of the lower oxygen-containing gas discharge passage 234b2 adjacent to the outer side of a lower vertex A5 (opposite to the oxygen-containing gas flow field 48) is longer than a bottom surface 120 of the lower oxygen-containing gas discharge passage 234b2 adjacent to the inner side of the lower vertex A5 (closer to the oxygen-containing gas flow field 48) in the horizontal direction. An upper surface 122 of the lower oxygen-containing gas discharge passage 234b2 adjacent to the outer side of an upper vertex A6 is longer than an upper surface 124 of the lower oxygen-containing gas discharge passage 234b2 adjacent to the inner side of the upper vertex A6 in the horizontal direction. The bottom surfaces 118, 120 and the upper surfaces 122, 124 are inclined from the horizontal direction (indicated by the arrow B).

In the lower oxygen-containing gas discharge passage 234b2, the entire bottom surfaces 118, 120 of the lower oxygen-containing gas discharge passage 234b2 are positioned below the bottom surface 49 of the oxygen-containing gas flow groove 48b at the lowermost position. In the lower oxygen-containing gas discharge passage 234b2, the upper surfaces 122, 124 of the lower oxygen-containing gas discharge passage 234b2 are positioned above the bottom surface 49 of the oxygen-containing gas flow groove 48b at the lowermost position. A central point P11 at the center between the lower end of the upper oxygen-containing gas discharge passage 234b1 and the upper end of the lower oxygen-containing gas discharge passage 234b2 (a point spaced by the equal distance from both ends) is positioned below the center P2. A seventh horizontal line L7 passing through a central point P11 passes through a center of figure P12 in the shape of the fuel gas supply passage 238a.

The central point P11 may be a point at the center between the center of figure of the upper oxygen-containing gas discharge passage 234b1 and the center of figure of the lower oxygen-containing gas discharge passage 234b2 (a point spaced by the equal distance from both points).

As shown in FIG. 10, the fuel gas discharge passages 238b include an upper fuel gas discharge passage 238b1 and a lower fuel gas discharge passage 238b2. A bottom surface 126 of the lower fuel gas discharge passage 238b2 adjacent to the outer side of a lower vertex A7 (opposite to the fuel gas flow field 58) is longer than a bottom surface 128 of the lower fuel gas discharge passage 238b2 adjacent to the inner side of the lower vertex A7 (closer to the fuel gas flow field 58) in the horizontal direction. An upper surface 130 of the lower fuel gas discharge passage 238b2 adjacent to the outer side of an upper vertex A8 is longer than an upper surface 132 of the lower fuel gas discharge passage 238b2 adjacent to the inner side of the upper vertex A8 in the horizontal direction. The bottom surfaces 126, 128 and the upper surfaces 130, 132 are inclined from the horizontal direction (indicated by the arrow B).

In the lower fuel gas discharge passage 238b2, the entire bottom surfaces 126, 128 of the lower fuel gas discharge passage 238b2 are positioned below the bottom surface 59 of the fuel gas flow groove 58b at the lowermost position. In the lower fuel gas discharge passage 238b2, the upper surfaces 130, 132 of the lower fuel gas discharge passage 238b2 are positioned above the bottom surface 59 of the fuel gas flow groove 58b at the lowermost position. A central point P13 between the lower end of the upper fuel gas discharge passage 238b1 and the upper end of the lower fuel gas discharge passage 238b2 (a point spaced by the equal distance from both ends) is positioned below the center P5. An eighth horizontal line L8 passing through the central point P13 passes through a center of figure P14 of the oxygen-containing gas supply passage 234a.

The central point P13 may be a point at the center between the center of figure (center) of the upper fuel gas discharge passage 238b1 and the center of figure (center) of the lower fuel gas discharge passage 238b2 (a point spaced by the equal distance from both points).

The fluid passages shown in FIGS. 9 and 10 offer the same advantages as in the case of the fluid passages shown in FIGS. 7 and 8.

The shapes, the sizes, the layout of the lower oxygen-containing gas discharge passages 34b2, 134b2, 234b2, and the lower fuel gas discharge passages 38b2, 138b2, 238b2 can be determined freely. In this case, preferably, the lower oxygen-containing gas discharge passages 34b2, 134b2, 234b2 have structure where at lease part of the bottom surfaces 41, 102, 104, 118, 120 of the lower oxygen-containing gas discharge passages 34b2, 134b2, 234b2 is positioned below the bottom surface 49 of the oxygen-containing gas flow groove 48b at the lowermost position. It is because, the water W produced in the oxygen-containing gas flow field 48 can flow smoothly toward the lower oxygen-containing gas discharge passages 34b2, 134b2, 234b2 by gravity.

Further, the lower fuel gas discharge passages 38b2, 138b2, 238b2 have structure where, at least part of the bottom surfaces 51, 110, 112, 126, 128 of the lower fuel gas discharge passages 38b2, 138b2, 238b2 is positioned below the bottom surface 59 of the fuel gas flow groove 58b at the lowermost position. It is because, the water W produced in the fuel gas flow field 58 can flow the lower fuel gas discharge passages 38b2, 138b2, 238b2 smoothly by gravity.

The embodiment of the present invention adopts cell-by-cell cooling structure where each of cell units is formed by sandwiching a membrane electrode assembly between two metal separators, and a coolant flow field is formed between the adjacent unit cells. Alternatively, for example, the cell unit may include three or more metal separators and two or more membrane electrode assemblies, and the metal separators and the membrane electrode assemblies are stacked alternately. In this case, so called skip cooling structure where the coolant flow field is formed between the cell units is adopted.

Alternatively, it may be possible to adopt structure where the first connection channel 70 and the second connection channel 80 are provided but the first drain 72 and the second drain 82 are not provided. Even in the case where the first drain 72 and the second drain 82 are not provided, the produced water W flows from the upper oxygen-containing gas discharge passages 34b1, 134b1, 234b1 to the lower oxygen-containing gas discharge passages 34b2, 134b2, 234b2 through the first connection channel 70, and the produced water W flows from the upper fuel gas discharge passages 38b1, 138b1, 238b1 to the lower fuel gas discharge passages 38b2, 138b2, 238b2 through the second connection channel 80. In this manner, in comparison with the case where the first connection channel 70 and the second connection channel 80 are not provided, it is possible to reduce the quantity of the stagnant water produced at the deep ends of the upper oxygen-containing gas discharge passages 34b1, 134b1, 234b1 and the upper fuel gas discharge passages 38b1, 138b1, 238b1. Alternatively, the produced water W may be discharged to the outside directly from the deep end of each of the discharge passages, without providing the first drain 72 and the second drain 82.

The fuel cell and the fuel stack according to the present invention are not limited to the above described embodiments. It is a matter of course that various structures may be adopted without departing from the gist of the present invention.

What is claimed is:

1. A fuel cell comprising:
a membrane electrode assembly including electrodes on both sides of an electrolyte membrane; and
separators provided on both sides of the membrane electrode assembly;
wherein each of the separators includes;
a surface with a single reactant gas flow field configured to allow a reactant gas to flow along an electrode surface in a horizontal direction;
a reactant gas supply passage connected to one end of the single reactant gas flow field in the horizontal direction, and configured to allow the reactant gas to flow in a stacking direction in which the membrane electrode assembly and the separators are stacked together; and
a reactant gas discharge passage connected to another end of the single reactant gas flow field in the horizontal direction, and configured to allow the reactant gas to flow in the stacking direction, and
the reactant gas discharge passage includes:
an upper reactant gas discharge passage; and
a lower reactant gas discharge passage positioned below the upper reactant gas discharge passage;
wherein, both the upper reactant gas discharge passage and the lower reactant gas discharge passage are connected to the another end of the single reactant gas flow field in the horizontal direction;
in the separator, a central point at a center between the upper reactant gas discharge passage and the lower reactant gas discharge passage is positioned below a center of the single reactant gas flow field in a gravity direction;
the single reactant gas flow field includes a plurality of reactant gas flow grooves extending in the horizontal direction and arranged in the gravity direction; and
at least part of a bottom surface of the lower reactant gas discharge passage is positioned below a bottom surface of the reactant gas flow groove at a lowermost position.

2. The fuel cell according to claim 1, wherein an entire bottom surface of the lower reactant gas discharge passage is positioned below the bottom surface of the reactant gas flow groove at the lowermost position.

3. The fuel cell according to claim 1, wherein an upper surface of the lower reactant gas discharge passage is positioned above the bottom surface of the reactant gas flow groove at the lowermost position.

4. The fuel cell according to claim 1, wherein the bottom surface of the lower reactant gas discharge passage is inclined from the horizontal direction.

5. The fuel cell according to claim 1, wherein in the separator, a central point at a center between a lower end of the upper reactant gas discharge passage and an upper end of the lower reactant gas discharge passage is positioned below the center of the reactant gas flow field in the gravity direction.

6. A fuel cell stack comprising a stack body including a plurality of stacked fuel cells, each of the fuel cells comprising:
a membrane electrode assembly including electrodes on both sides of an electrolyte membrane; and
separators provided on both sides of the membrane electrode assembly;
wherein each of the separators includes;
a surface with a single reactant gas flow field configured to allow a reactant gas to flow along an electrode surface in a horizontal direction;
a reactant gas supply passage connected to one end of the single reactant gas flow field in the horizontal direction, and configured to allow the reactant gas to flow in a stacking direction in which the membrane electrode assembly and the separators are stacked together; and
a reactant gas discharge passage connected to another end of the single reactant gas flow field in the horizontal direction, and configured to allow the reactant gas to flow in the stacking direction, and
the reactant gas discharge passage includes:
an upper reactant gas discharge passage; and
a lower reactant gas discharge passage positioned below the upper reactant gas discharge passage;
wherein, both the upper reactant gas discharge passage and the lower reactant gas discharge passage are connected to the another end of the single reactant gas flow field in the horizontal direction;
in the separator, a central point at a center between the upper reactant gas discharge passage and the lower reactant gas discharge passage is positioned below a center of the single reactant gas flow field in a gravity direction;
the single reactant gas flow field includes a plurality of reactant gas flow grooves extending in the horizontal direction and arranged in the gravity direction; and
at least part of a bottom surface of the lower reactant gas discharge passage is positioned below a bottom surface of the reactant gas flow groove at a lowermost position.

7. The fuel cell stack according to claim 6, further comprising a connection channel configured to connect an end of the upper reactant gas discharge passage opposite to the flow direction of the reactant gas and an end of the lower reactant gas discharge passage opposite to the flow direction of the reactant gas together.

8. The fuel cell stack according to claim 7, further comprising a drain connected to the connection channel, and configured to discharge water produced in the connection channel to outside.

9. The fuel cell stack according to claim 8, wherein the drain is positioned below the lower reactant gas discharge passage.

* * * * *